June 12, 1956 K. SCHLESINGER 2,750,441

INTERCARRIER SOUND SYSTEM

Filed Sept. 6, 1951

INVENTOR.
Kurt Schlesinger
BY
Norman L. Mueller
Atty.

2,750,441
Patented June 12, 1956

2,750,441

INTERCARRIER SOUND SYSTEM

Kurt Schlesinger, Maywood, Ill., assignor to Motorola, Inc., Chicago, Ill., a corporation of Illinois Application September 6, 1951, Serial No. 245,281

14 Claims. (Cl. 178—5.8)

This invention relates generally to frequency modulation sound systems, and more particularly to a system for deriving audio signals from frequency modulated intercarrier sound waves in a television receiver.

In television broadcasting, wherein both the picture and sound are reproduced, it has been common practice to transmit two carrier waves, one of which is modulated by the video or picture signal, and the other of which is modulated by the sound signal. Although it is possible to detect and reproduce the two signals separately, it has become standard practice to beat the two signals together and derive the sound from the resulting intercarrier signal which has a low frequency, equal to the difference between the sound carrier and the video carrier. Such a sound detecting system has the advantage of simplicity over systems in which the sound is separate from the video stages, and the further advantage that oscillator drift does not affect the sound reproduction. However, these systems have the disadvantage that pulse components of the amplitude modulated video signal produce amplitude modulation of the intercarrier wave. One factor which is believed to contribute to the buzz so produced is the vertical synchronization component of the video signal which is a sharp 60 cycle pulse. As this 60 cycle pulse has strong harmonics in the audio frequency range, which die down slowly, it is difficult to filter the same out, and satisfactory removal thereof requires considerable additional equipment. Consequently in all but the most expensive television receivers the buzz is present to some extent and may be quite noticeable when the reproduced video signal has certain characteristics.

It is therefore an object of the present invention to provide an improved sound system for television receivers.

A further object of this invention is to provide a simple and inexpensive television sound system operating from the intercarrier sound wave which is effective to eliminate amplitude modulation of the intercarrier wave.

A still further object of this invention is the provision of a sound system particularly adaptable for use in a color television receiver in which the color subcarrier wave is utilized in the sound system.

A feature of this invention is the provision of a double-beat television sound system in which the inter-carrier wave is converted to a lower frequency and detected by frequency counting means.

Another feature of this invention is the provision of a television sound system in which a frequency modulated wave controls the repetition rate of pulses produced by a blocking oscillator to derive the modulation, with the pulses being of constant wave form so that amplitude variations of the wave do not appear in the pulse output.

A further feature of this invention is the provision of a double-beat sound detecting system wherein the frequency of the intercarrier wave is reduced by an oscillating mixer having a single vacuum tube section.

A still further feature of this invention is the provision of a sound system for a color television receiver in which the color subcarrier wave is used for reducing the frequency of the intercarrier sound wave to provide a low frequency wave from which audio is developed.

Further objects and features, and the attending advantages of the invention will be apparent from a consideration of the following description when taken in connection with the accompanying drawings, in which.

In practicing the invention there is provided a sound system for use in a television receiver and which operates from the intercarrier sound wave. The intercarrier wave is selected and limited in a limiter stage to remove video components and undesired amplitude modulation as much as possible. The limited intercarrier wave is then applied to a mixer wherein the intercarrier wave is mixed with a local oscillation at a frequency close to the intercarrier frequency. This may be provided by the mixer itself or by a separate oscillator. The output of the mixer is a low frequency wave which may preferably be in the range between 300 and 600 kilocycles, on which the sound modulation of plus or minus 25 kilocycles appears. As the deviation is now a relatively high percentage of the new center frequency, the modulating signal can be detected by counter circuits. Such counter circuits are linear and provide a second limiting action which is effective to further reduce the sound buzz resulting from amplitude modulation of the intercarrier sound signal. The oscillations for reducing the intercarrier wave should have a frequency such that the center frequency of the produced wave is of the order of 300 to 600 kilocycles. In a color television receiver, the color subcarrier wave can be used for the second heterodyne process and a separate oscillator is therefore not required.

Figure 1:
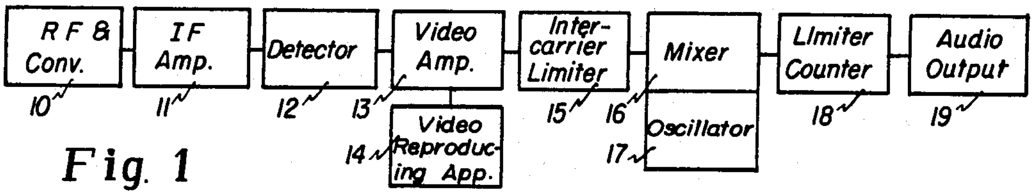
Fig. 1 is a block diagram illustrating the television receiver system in accordance with the invention.

Referring now to the drawings, in Fig. 1 there is illustrated a television receiver including radio frequency amplifying and converting stages 10, intermediate frequency amplifying stages 11, second detector 12, video amplifier 13, video reproducing apparatus 14, first intercarrier limiter 15, mixer 16, oscillator 17, second limiter and counter 18, and audio output 19. The components designated 10 to 15 inclusive may be of standard construction and operate in the usual manner to provide reproduction of the picture from the video signal, and to provide a limited intercarrier sound wave.

The mixer 16 reduces the frequency of the limited intercarrier wave by mixing the same with oscillations from oscillator 17 which may be either a separate oscillator or an oscillating circuit of the mixer itself. The low beat frequency output from the mixer 16 may have a center frequency in the range from 300 to 600 kilocycles providing a frequency modulated wave with wide deviation (plus or minus 25 kilocycles). The audio is recovered from the low center frequency wave by counter 18 which also provides limiting action and is therefore effective to substantially reduce the buzz developed in the intercarrier sound system. The output of the limiter and counter 18 is applied to the audio output system 19 which may be of standard construction. The particular construction of limiters suitable for use in this system and the circuits of the mixer, oscillator and counter are disclosed more in detail in Figs. 2 and 3.

Figure 2:
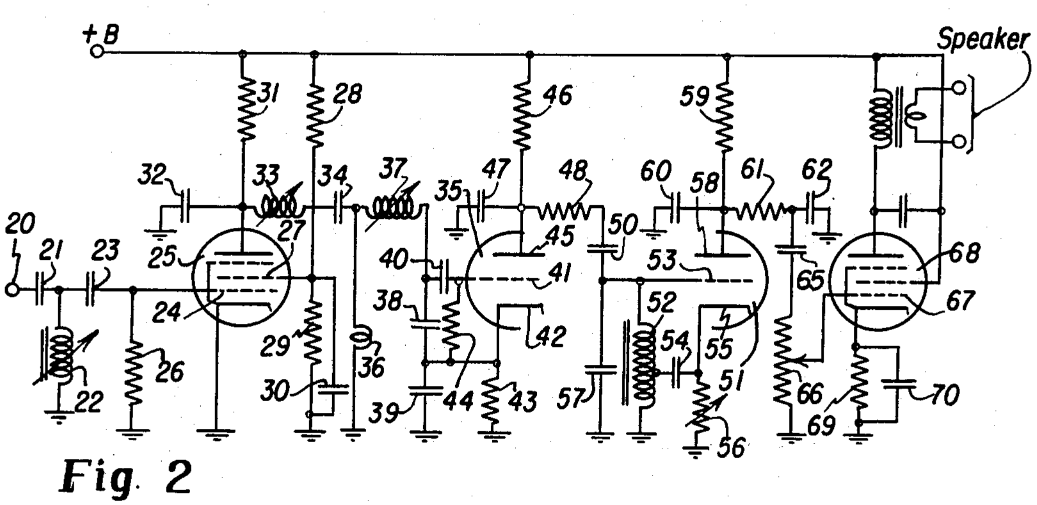
Fig. 2 is a circuit diagram illustrating one embodiment of the invention.

Referring now to Fig. 2, the composite video signal and intercarrier sound signal are applied to the circuit at terminal 20. The intercarrier signal is applied through condenser 21 to inductor 22 which is adjustable to tune the input to 4.5 megacycles so that the intercarrier signal is selected with respect to the composite video signal. The selected signal is applied through a fast time constant coupling circuit including condenser 23 and resistor 26 to the grid 24 of the limiter stage 25. The tube 25 of the limiter stage is a pentode having the screen 27 thereof connected to a reduced bias voltage through the voltage divider including resistors 28 and 29, with condenser 30 providing radio frequency bypass. The plate of tube 25 is tuned by condenser 32 and inductor 33 to further select the intercarrier sound signal at 4.5 megacycles. Plate potential is applied through resistor 31.

The limited intercarrier wave is then applied to the mixer which includes the triode section 35 and an oscillating circuit coupled thereto. The oscillating circuit is of the Colpitts type including coupling inductor 36, tuning inductor 37 and balanced condensers 38 and 39. The values of these elements are chosen to provide the desired local oscillator frequency which may be of the order of 3.9 to 4.2 megacycles. Condenser 40, and resistors 43 and 44 provide coupling between the series resonant circuit and the grid 41 and cathode 42 of the triode section 35. The intercarrier wave from the limiter 25 is applied through coupling condenser 34 to the common inductance 36 of the mixer tuned circuit. The local oscillations are therefore mixed with the intercarrier sound wave to produce a beat frequency of 300 to 600 kilocycles depending on the frequency of the oscillator circuit. This appears at the plate 45 of the triode 35 which is connected to plus B through resistor 46. The filter formed by condenser 47 and resistor 48 removes the radio frequencies from the mixer output.

The mixer output is applied through condenser 50 to the frequency discriminator or counter stage which includes a triode 51. The counter stage is in effect a blocking oscillator including a tapped coil 52, the high potential point of which is connected to the grid 53 of the tube 51, and the tap on which is connected through condenser 54 to the cathode 55 of the triode. Variable resistor 56 and condenser 54 in the cathode lead provide control of the repetition rate of the blocking oscillator. A small condenser 57 is bridged across the coil 52 for controlling the width of the pulses produced by the blocking oscillator. The plate 58 of the triode 51 is connected to B plus through resistor 59 and is bypassed by condenser 60. The condenser 60 together with resistor 61 and condenser 62 provide a low pass filter for extracting the audio signal from the blocking oscillator output.

The new low frequency modulated wave applied to the blocking oscillator changes the repetition rate of the pulses produced thereby. This changes the plate current through resistor 59 proportionally as long as the pulse shape does not change. As the wave form of the pulses produced by the blocking oscillator are controlled by coil 52 and condenser 57, and do not change substantially with the amplitude of the applied wave, amplitude modulation does not appear in the output. The audio frequency signal is derived from the varying voltage across resistor 59 by the audio filter, with the audio signal developed across condenser 62 being relatively large. By selection of resistor 61 and condenser 62 the desired deemphasis of the higher frequencies of the audio signal can be obtained.

The audio signal across condenser 62 is applied through condenser 65 to volume control resistor 66. The movable tap on the volume control resistor 66 is connected to the grid 67 of the audio output stage 68. The audio output stage may be of standard construction and provides high level audio signals to a loudspeaker or other sound reproducing means.

It is seen that in the sound system disclosed in Fig. 2, the sound signal is derived from the intercarrier sound wave by a circuit requiring only a double triode tube in addition to the limiter stage and the audio output stage which are required in all systems. This is much simpler and less expensive than sound systems presently used and provides improved limiting action over such systems.

Figure 3:
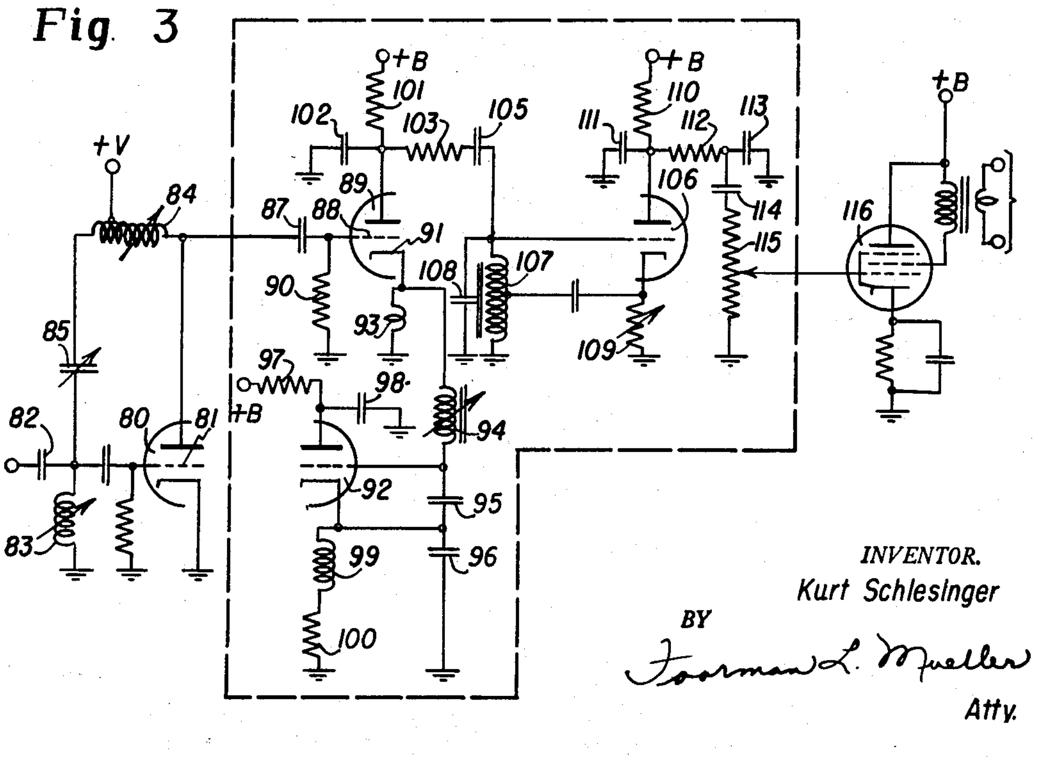
Fig. 3 is a circuit diagram illustrating a further embodiment of the invention.

In Fig. 3 there is illustrated a system generally similar to that of Fig. 2 except that a separate oscillator is provided for producing the local oscillations. In this embodiment the limiter is provided by a neutralized triode instead of a pentode. Although this produces the limited intercarrier wave with lower gain, the signal amplitude may be sufficient to provide the required audio output. The limiter stage includes the triode section 80 having a grid 81 to which the composite video and intercarrier signal is applied. The signal is applied through condenser 82 and across tuning inductor 83 which selects the intercarrier sound signal with respect to the composite video signal. The plate of the limiter is connected through inductor 84 to a low voltage source indicated plus V which may be of the order of 20 volts. The positive potential is actually applied to a tap on the inductor and the other end is connected through variable condenser 85 to the grid of the limiter to provide neutralization. The plate circuit is tuned to 4.5 megacycles to further select the intercarrier wave.

The output of limiter 80 is applied through condenser 87 to the grid 88 of the mixer tube 89. The grid is biased by resistor 90. Oscillations are preferably applied to the cathode 91 of the mixer triode being developed in the oscillator including the triode 92. This oscillator may be of standard construction and is illustrated as being of the Colpitts type. Tuning of the oscillator is not critical since variations in the oscillator frequency are small compared to the wide deviation. The oscillator includes a series tuned circuit formed by inductor 93, inductor 94 and balanced condensers 95 and 96. Inductor 94 is adjustable to provide the required frequency and small inductor 93 is connected to the cathode 91 to apply the oscillations to the mixer tube. The plate of the oscillator is connected to plus B through resistor 97 and is bypassed by condenser 98. The cathode of the oscillator is grounded through conductor 99 and resistor 100.

The plate of the mixer 89 is connected to B plus through resistor 101 with condenser 102 and resistor 103 forming a radio frequency filter for the output. The output is applied through condenser 105 to the blocking oscillator including the tube 106. This blocking oscillator may be identical to that disclosed in Fig. 2 including a tapped coil 107, condenser 108 for providing pulse width control, and adjustable resistor 109 for controlling the repetition rate. The plate of the tube 106 is connected to plus B through resistor 110. The blocking oscillator also serves as a limiter, with the limited output including the audio signal as previously described. This is derived by the filter including condenser 111, resistor 112 and condenser 113. Resistor 112 and condenser 113 may be adjusted to provide the desired audio emphasis. The audio output is derived from condenser 113 applied through condenser 114 to potentiometer 115. The desired audio level is taken from the potentiometer 115 and applied to the output stage 116 which increases the level of the audio signal.

As previously stated, in color television receivers having a local oscillator providing the color subcarrier frequency, the oscillations for reducing the frequency of the intercarrier wave can be derived from this color subcarrier oscillator so that a separate oscillator is not required. In such case the system may be used in exactly the form shown in Fig. 3, with the oscillations from the subcarrier oscillator being applied to the cathode of the mixer tube. Various frequencies have been proposed for use as the color subcarrier frequency in the range from about 3.6 to 4.0 megacycles. Although any of these frequencies could be used, the higher frequencies of the order of 3.9 and 4.0 megacycles would be preferable since in such case the center frequency of the low frequency wave applied to the counter is of the order of 500 to 600 kilocycles.

When the audio output system is used in monochrome television receivers or other systems wherein the local oscillation is not already available and must be generated in the system itself, it may be desirable to use frequencies nearer the audio carrier frequency as for example, frequencies of the order of 4.2 megacycles or 4.8 megacycles for use with a carrier wave of 4.5 megacycles as described. This provides a double beat output of 300 kilocycles which results in doubling of the counter efficiency as compared to operation at 600 kilocycles, since the relative deviation is doubled. When operating at higher frequencies, such as 600 kilocycles or more, the counter blocking oscillator may be run at a sub-harmonic as for example at half the beat frequency. It is to be noted that the oscillations need not be at a lower frequency than the intercarrier wave but may in some instances provide better results when the oscillator frequency is above the carrier frequency.

It is seen from the above that relatively simple systems are provided which require very few vacuum tubes. These systems provide adequate audio output and have the advantage that the counter type detector for deriving the audio from the low frequency modulated wave also provides additional limiting action. This is particularly advantageous in intercarrier television receivers utilizing intercarrier sound since the intercarrier action provides a 60 cycle buzz, and because of the characteristics of the pulses producing the buzz, elimination thereof is difficult.

Although certain embodiments of the invention have been described which are illustrative thereof, it is obvious that various changes and modifications can be made therein without departing from the intended scope of the invention as defined in the appended claims.

I claim:

1. A television receiving system including in combination, means for deriving the video signal and an intercarrier sound wave having a frequency of approximately 4.5 megacycles frequency modulated by audio signals and amplitude modulated by low frequency pulse components of said video wave, limiter means for selecting said intercarrier wave and limiting the same to reduce amplitude modulation thereof, oscillator means for producing a wave of fixed frequency differing from said frequency of said intercarrier wave by the order of 300 to 600 kilocycles, mixer means coupled to said limiter means and said oscillator means for combining said limited wave and said wave produced by said oscillator means to produce a low frequency, frequency modulated wave, blocking oscillator means coupled to said mixer means providing output pulses of substantially constant wave form having a repetition rate following the frequency variations of said low frequency wave, filter means for deriving said audio modulating signals from said blocking oscillator pulses, and means for reproducing said audio modulating signals.

2. A television receiver including, means for deriving a video signal and an intercarrier wave frequency modulated by audio signals and amplitude modulated by video components of pulse wave form having harmonic components in the audio range, limiter means for selecting said intercarrier wave and limiting the same for reducing said amplitude modulation thereof, oscillator means for producing a wave having a frequency differing from said intercarrier wave by not more than one megacycle, mixer means coupled to said limiter means and said oscillator means for combining said limited wave and said oscillator wave to produce a low-frequency, frequency modulated wave, frequency discriminator means coupled to said mixer means including a blocking oscillator circuit substantially unresponsive to amplitude variations of said low frequency wave but responsive to frequency variations thereof for deriving said audio modulating signals from said low frequency wave, and means for reproducing said derived audio signals.

3. A television receiver including, means for deriving a carrier wave having a frequency of approximately 4.5 megacycles frequency modulated by audio signals, limiter means for limiting said modulated carrier wave, oscillator means for producing a wave of fixed frequency differing from said frequency of said carrier wave by not more than one megacycle, mixer means coupled to said limiter means and said oscillator means for combining said limited wave and said wave produced by said oscillator means to produce a low frequency, frequency modulated wave, second oscillator means coupled to said mixer means providing output pulses at a repetition rate following the frequency variations of said low frequency wave, said output pulses being of substantially constant wave form and being independent of the amplitude of said low frequency wave so that amplitude variations thereof do not substantially affect said output pulses, filter means for deriving said audio modulating signals from said oscillator output pulses, and means for reproducing said audio modulating signals.

4. A television receiver including in combination, means for deriving the video signal and an intercarrier wave having a frequency of approximately 4.5 megacycles frequency modulated by audio signals and amplitude modulated by low frequency pulse components of said video signal, a limiter stage for selecting said intercarrier wave and limiting the same, a mixer stage coupled to said limiter stage and having a circuit tuned to a frequency differing from said carrier wave by the order of 300 to 600 kilocycles, said mixer stage combining said limited wave and oscillations developed in said tuned circuit thereof to produce a low-frequency, frequency modulated wave, a blocking oscillator stage coupled to said mixer stage for deriving said audio modulating signals from said low frequency wave, said blocking oscillator producing pulses of substantially constant wave form substantially independent of the amplitude of said carrier wave with the repetition rate thereof following frequency variations of said low frequency wave, audio filter means for deriving said audio signals from said blocking oscillator pulses and an audio reproducing stage coupled to said blocking oscillator stage for reproducing said derived audio signals.

5. A television receiver including in combination, means for deriving the video signal and an intercarrier wave having a frequency of approximately 4.5 megacycles frequency modulated by audio signals and amplitude modulated by low frequency pulse components of said video signal, a mixer stage having a circuit tuned to a frequency differing from said carrier wave by not more than 600 kilocycles, said mixer stage combining intercarrier wave and oscillations developed in said tuned circuit thereof to produce a low-frequency, frequency modulated wave, a blocking oscillator stage coupled to said mixer stage for deriving said audio modulating signals from said low frequency wave, said blocking oscillator stage producing pulses of substantially constant form substantially independent of the amplitude of said carrier wave with the repetition rate thereof following frequency variations of said low frequency wave, audio filter means for deriving said audio signals from said blocking oscillator pulses and an audio reproducing stage coupled to said blocking oscillator stage for reproducing said derived audio signals.

6. A television receiver including in combination, means for deriving the video signal and an intercarrier wave having a frequency of approximately 4.5 megacycles frequency modulated by audio signals and amplitude modulated by low frequency pulse components of said video signal, a limiter stage for selecting said intercarrier wave and limiting the same, a mixer stage coupled to said limiter stage including a triode valve and a circuit tuned to a predetermined frequency differing from said intercarrier wave by the order of 300 to 600 kilocycles, said tuned circuit providing oscillations in said triode valve at said predetermined frequency which are combined with said limited wave to produce a low-frequency, frequency modulated wave, a frequency discriminator stage coupled to said mixer stage including a second triode valve and means coupled thereto providing a frequency counting circuit for deriving said audio modulating signals from said low frequency wave, said frequency counting circuit being substantially unresponsive to amplitude modulation of said low frequency wave, and an audio reproducing stage coupled to said frequency counting circuit for reproducing said derived audio signals.

7. In a television receiver including means for deriving the video signal and an intercarrier wave having a frequency of approximately 4.5 megacycles frequency modulated by audio signals and amplitude modulated by low frequency pulse components of said video signal, and a limiter stage for selecting said intercarrier wave and limiting the same, means for deriving high level audio signals free of said amplitude modulation components from said limited intercarrier wave including first and second triode sections and circuit elements associated therewith, said first triode section operating in a combined mixer-oscillator stage and including a circuit formed by said circuit elements tuned to a predetermined frequency differing from said intercarrier wave by the order of 300 to 600 kilocycles, said tuned circuit providing oscillations in said first triode section at said predetermined frequency which are combined with said limited wave to produce a low-frequency, frequency modulated wave, said second triode section operating in a combined limiter-counter stage coupled to said mixer oscillator stage including a blocking oscillator circuit coupled to said second triode section for deriving said audio modulating signals from said low frequency wave, said blocking oscillator circuit being substantially unresponsive to amplitude modulation of said low frequency wave.

8. A color television receiver including in combination, means for heterodyning a received signal to produce an intermediate frequency signal, means for deriving a frequency modulated intercarrier sound wave having a frequency of approximately 4.5 megacycles from the intermediate frequency signal, oscillator means for producing a color subcarrier wave having a frequency within the range from 3.5 to 4.0 megacycles, mixer means coupled to said deriving means and to said oscillator means for combining said waves therefrom to produce a low-frequency, frequency modulated wave, frequency discriminator means coupled to said mixer means for deriving said audio modulating signals from said low frequency wave, and means for reproducing said derived audio signals.

9. A color television receiver including in combination, mixer means for combining a video signal component and a sound signal component of the received signal which differ by approximately 4.5 megacycles to produce a frequency modulated intercarrier sound wave having a frequency of approximately 4.5 megacycles, limiter means for limiting said intercarrier wave, oscillator means for producing a color subcarrier wave having a frequency within the range from 3.5 to 4.0 megacycles, mixer means coupled to said limiter means and to said oscillator means for combining said waves therefrom to produce a low-frequency, frequency modulated wave, frequency counting means coupled to said mixer means for deriving said audio modulating signals from said low frequency wave, and means for reproducing said derived audio signals.

10. A color television receiver for operation with received signals including an amplitude modulated video carrier wave and a frequency modulated audio carrier wave, said receiver including in combination, frequency converting means for respectively converting the received carrier waves to intermediate frequency waves, second detector means coupled to the output of said converting means for heterodyning the amplitude modulated video intermediate frequency wave and the frequency modulated sound intermediate frequency wave and having an output in which is produced a frequency modulated intercarrier sound wave, oscillator means for producing a color subcarrier wave, mixer means coupled to said output of said second detector means and to said oscillator means for combining said waves therefrom to produce a frequency modulated wave having a low center frequency, frequency discriminator means coupled to said second mixer means for deriving the audio modulating signals from said low center frequency wave, and means for reproducing said derived audio signals.

11. A television receiving system for operating with received signals including an amplitude modulated video carrier wave and a frequency modulated audio carrier wave, said receiving system including in combination, frequency converting means for respectively converting the received carrier waves to intermediate frequency waves, second detector means coupled to the output of said frequency converting means for heterodyning the amplitude modulated video intermediate frequency wave and the frequency modulated sound intermediate frequency wave and having an output in which is produced an intercarrier sound wave having a frequency equal to the difference in frequency of the video carrier wave and the audio carrier wave, which intercarrier sound wave is frequency modulated by audio signals, mixer means coupled to the output of said second detector means and including means therewith providing oscillations at a frequency differing from the frequency of said intercarrier sound wave by not more than one megacycle, said mixer means combining said intercarrier sound wave and said oscillations and producing a frequency modulated wave having a low frequency equal to the difference between the frequency of said intercarrier sound wave and the frequency of said oscillations, frequency discriminator means coupled to said mixer means for deriving the audio modulating signals from said low frequency wave produced by said mixer means, and means for reproducing said derived audio signals.

12. A color television receiver including in combination, means for deriving an intercarrier wave frequency modulated by sound signals and amplitude modulated by video pulse components within the audio range, limiter means for limiting said intercarrier wave, oscillator means for producing a color subcarrier wave, mixer means coupled to said limiter means and to said oscillator means for combining said waves therefrom to produce a frequency modulated wave of a low center frequency, frequency counting means coupled to said mixer means and being substantially unresponsive to amplitude variations of said low frequency wave and responsive to frequency variations thereof for deriving said audio modulating signals therefrom, and means for reproducing said derived audio signals.

13. A color television receiver including in combination, means for deriving an intercarrier wave having a frequency of approximately 4.5 megacycles frequency modulated by sound signals and including amplitude modulation within the audio range, limiter means for limiting said intercarrier wave, oscillator means for producing a color subcarrier wave of a frequency within the range from 3.5 to 4.0 megacycles, mixer means coupled to said limiter means and to said oscillator means for combining said waves therefrom to produce a low-frequency, frequency modulated wave, blocking oscillator frequency discriminator means coupled to said mixer providing output pulses at a repetition rate following the frequency variations of said low frequency wave, said output pulses being of substantially constant wave form and being independent of the amplitude of said low frequency wave, filter means for deriving said audio modulating signals from said output pulses, and means for reproducing said derived audio signals.

14. A television receiving system including in combination, means for deriving an intercarrier sound wave frequency modulated by audio signals, mixer means coupled to said deriving means and including means therewith providing oscillations at a frequency differing from the frequency of said intercarrier sound wave by not more than one megacycle, said mixer means combining said intercarrier sound wave and said oscillations and producing a frequency modulated wave having a center frequency equal to the difference between the frequency of said intercarrier sound wave and the frequency of said oscillations, and frequency counting means coupled to said mixer means for deriving said audio modulating signals, said frequency counting means being substantially unresponsive to amplitude variations of the low frequency wave produced by said mixer means and responsive to frequency variations thereof.

References Cited in the file of this patent

UNITED STATES PATENTS

| | | |
|---|---|---|
| 2,484,556 | Custin | Oct. 11, 1949 |
| 2,489,948 | Bell | Nov. 29, 1949 |
| 2,498,488 | Fyler | Feb. 21, 1950 |
| 2,522,110 | Forster | Sept. 12, 1950 |
| 2,545,420 | Sziklai | Mar. 13, 1951 |